United States Patent
Favaron et al.

(10) Patent No.: US 9,163,726 B2
(45) Date of Patent: Oct. 20, 2015

(54) PISTON RING AND PROCESS FOR MANUFACTURING A PISTON RING

(75) Inventors: Rodrigo Favaron, São Paulo (BR); Robert Richard Banfield, São Paulo (BR)

(73) Assignees: MAHLE International GmbH, Stuttgart (DE); MAHLE Metal Leve S/A, Jundiai, Sao Paulo (BR)

( * ) Notice: Subject to any disclaimer, the term of this patent is extended or adjusted under 35 U.S.C. 154(b) by 691 days.

(21) Appl. No.: 13/497,886

(22) PCT Filed: Sep. 24, 2010

(86) PCT No.: PCT/BR2010/000312
§ 371 (c)(1),
(2), (4) Date: Jun. 5, 2012

(87) PCT Pub. No.: WO2011/035399
PCT Pub. Date: Mar. 31, 2011

(65) Prior Publication Data
US 2012/0248710 A1    Oct. 4, 2012

(30) Foreign Application Priority Data
Sep. 24, 2009  (BR) ...................................... 0903320

(51) Int. Cl.
*F16J 9/22* (2006.01)
*F16J 9/26* (2006.01)

(52) U.S. Cl.
CPC ..... *F16J 9/26* (2013.01); *F16J 9/22* (2013.01)

(58) Field of Classification Search
CPC .................. F16J 9/00; F16J 9/20; F16J 9/22; F16J 9/26

USPC .............................. 277/440–444; 29/888.074
See application file for complete search history.

(56) References Cited

U.S. PATENT DOCUMENTS

| | | | |
|---|---|---|---|
| 4,570,946 A * | 2/1986 | Tsuchiya et al. ............... | 277/443 |
| 4,979,757 A * | 12/1990 | Mizuno ......................... | 277/443 |
| 5,316,321 A * | 5/1994 | Ishida et al. ................... | 277/443 |
| 5,469,616 A * | 11/1995 | Miyazaki et al. ......... | 29/888.074 |
| 6,508,473 B1 * | 1/2003 | Tanaka et al. ................. | 277/440 |
| 6,698,763 B2 * | 3/2004 | Ogawa et al. ................. | 277/434 |

(Continued)

FOREIGN PATENT DOCUMENTS

| | | |
|---|---|---|
| DE | 10 2005 023 6 | 11/2006 |
| JP | 5-172248 | 7/1993 |
| JP | 2002-61746 | 2/2002 |

OTHER PUBLICATIONS

International Search Report of PCT/BR2010/000312, Jan. 18, 2011.

*Primary Examiner* — Kristina Fulton
*Assistant Examiner* — Nicholas L Foster
(74) *Attorney, Agent, or Firm* — Collard & Roe, P.C.

(57) ABSTRACT

The present invention refers to a piston ring, particularly for use in the piston channel of an internal combustion engine or a compressor, comprising at least a substantially ring-shaped metallic base (2) having at least a first region (20), at least a second region (21) and at least a gap (22), the first region (20) being positioned in a way substantially opposite to the gap (22), the ring comprising at least a nitrided layer (3) in the second region (21) and comprising at least reduction of the nitrided layer (3) in the first region (20), whereas the reduced nitrided layer (3) is at least partially blocked in the first region (20) due to the previous application of an intermediate layer (4).

23 Claims, 6 Drawing Sheets

(56) References Cited

U.S. PATENT DOCUMENTS

| | | | |
|---|---|---|---|
| 7,052,019 B2 * | 5/2006 | Miida | 277/443 |
| 2004/0056425 A1 * | 3/2004 | Miida | 277/459 |
| 2006/0269790 A1 * | 11/2006 | Sarabanda et al. | 428/698 |
| 2008/0136116 A1 * | 6/2008 | Sarabanda et al. | 277/443 |

* cited by examiner

Cut A-A

Cut B-B

Cut A-A

Cut B-B

US 9,163,726 B2

PISTON RING AND PROCESS FOR MANUFACTURING A PISTON RING

CROSS REFERENCE TO RELATED APPLICATIONS

This application is the National Stage of PCT/BR2010/000312 filed on Sep. 24, 2010, which claims priority under 35 U.S.C. §119 of Brazilian Application No. P10903320-3 filed on Sep. 24, 2009, the disclosure of which is incorporated by reference.

The present invention refers to a piston ring, particularly conceived for the use in the piston channel of an internal combustion engine and/or compressor, having a metallic base to which a nitrided superficial coating is applied all over its surface, except to a region located substantially opposite to the gap or slit of the ring. The present invention also refers to the process for manufacturing the piston ring.

BACKGROUND OF THE INVENTION

In internal combustion engines with one or more pistons which move inside respective cylinders, each piston comprises one or more rings, which undergo severe efforts when the engine is working.

A way to ensure the wear resistance of a ring, so that it has a long shelf-life, is to apply a layer of coating over the base metal of which it consists. The coating specifically developed to resist wearing and abrasion, keeps the properties of development of the ring even after millions of cycles of ring displacement inside the cylinder.

A first representative prior art is North-American U.S. Pat. No. 6,698,763, which refers to a piston ring with a stainless steel base to which a nitrided layer is initially applied, wherein the nitrided layer comprises a diffusion layer and a compound layer, the latter being applied over the first.

After the application, the upper and lower circular corners of the ring are chamfered all over their extension in such a way that, in these places, all the nitrided layer is removed, exposing the base material. Finally, in the outer side surface of the ring, which stays in contact with the cylinder wall, a ceramic layer of coating is applied.

Removing the chamfers prevents stress from building up in these places and significantly reduces the emergence and propagation of cracks.

A second representative prior art is North-American U.S. Pat. No. 6,508,473, which refers to a piston ring with a stainless sell base to which a nitrided layer is applied all over its extension, except to the outer surface in contact with the cylinder, to which another coating is applied, through the process of ion plating or PVD (Physical Vapor Deposition), comprised by chromium nitride (in its phases CrN and/or $Cr_2N$) or titanium nitride. This second coating and the nitrided layer are separated, without overlapping each other or making contact, in respective regions adjacent to the upper and lower surface sides. The distance between both coatings presents values ranging from 0.001 millimeters (mm) to 0.3 mm.

With this embodiment, occasional cracks that emerge have their propagation limited, avoiding the formation of cracks of such an extension that lead to the detachment of the recoating.

A third representative prior art is disclosed in Japanese patent document JP 2002-61746, which refers to a piston ring with a base in steel or molten iron which has a concave recess on the outer surface (the one in contact the cylinder wall). Initially, a nitrided layer is applied to the base; however, this layer is not applied to, or is removed exactly from, the outer surface, due to its properties of little ductility. Over the outer surface, a layer of chromium nitride is applied by the process of ion plating or PVD (Physical Vapor Deposition), being later lapidated. The resulting ring has good abrasion resistance and appropriate resistance to the detachment of recoating.

A fourth representative prior art is disclosed in Japanese patent document JP 5-172248, which refers to a piston ring with a metallic base to which a hard ceramic layer of chromium or titanium nitride is applied. Immediately afterwards, a nitrided layer is formed on the side, lower, upper surfaces and on the inner face of the ring. The outer corner, turned to the cylinder wall, does not receive any nitrided layer and is provided, therefore, only with a hard ceramic layer initially deposited by the process of ion plating or PVD (Physical Vapor Deposition).

However, please note, none of the documents above-mentioned considers that the efforts suffered by the ring vary in a non inconsiderable manner, that is, that the ring does not suffer all the efforts in a completely homogenous manner.

By means of extensive studies, tests and simulations, the applicant discovered that most of the efforts suffered by a piston ring and with potential to cause recoating detachment or structural damages lie in a region substantially opposite to its gap, that is, substantially located at 180° from the gap. In this region, due to the efforts suffered, relevant micro-cracks emerge on a coating layer formed, for instance, by CrN, and they propagate up to the moment the ring breaks. In a set of tests carried out, it was verified that, in the other portions of the ring, the emergence of cracks on the CrN layer remained at acceptable values.

Without relying on the removal of chamfers or other procedures that make the manufacture of the piston ring expensive, the applicant presents a completely new and original product, which has no nitrided layer in the portion facing the gap, brilliantly fulfilling all the requirements of performance and durability.

Purposes of the Invention

Therefore, one of the purposes of this invention is to provide a piston ring, preferably but not mandatorily as a compression ring, conceived for use in internal combustion engines or compressors, having a nitrided layer all over its extension, except on the region which is substantially opposite to its gap or slit.

Another purpose of the present invention is a piston ring, preferably but not mandatorily as a compression ring, conceived for use in internal combustion engines or compressors, which has a coating of chromium nitride deposited through the process of ion plating or PVD (Physical Vapor Deposition) and which has reduced values of formation of potentially destructive micro-cracks.

Finally, another purpose of the present invention is the process for manufacturing the ring aforesaid.

BRIEF DESCRIPTION OF THE INVENTION

The goals of the present invention are achieved by a piston ring, particularly for use in the piston channel of an internal combustion engine or a compressor, comprising at least a substantially ring-shaped metallic base having at least a first region, at least a second region and at least a gap, the first region being positioned in a manner substantially opposite to the gap, the ring further comprising at least a nitrided layer in the second region and an intermediate layer applied to the first region, the intermediate layer applied to the first region being capable of reducing the formation of the nitrided layer in the first region at least 50% in relation to the nitrided layer in the second region.

The goals of the present invention are also achieved by a piston ring, particularly for use in the piston channel of an internal combustion engine or a compressor, having at least a substantially ring-shaped metallic base having at least a first region, at least a second region and at least a gap; the first region being positioned in manner substantially opposite to the gap, the ring further comprising at least a nitrided layer in the second region and not comprising any nitrided layer in the first region.

Moreover, the goals of present invention are achieved through a process for manufacturing a piston ring as defined in the previous paragraph, comprising the following stages:
  (i) full conformation of the base;
  (ii) applying a intermediate layer to the first region;
  (iii) formation of a nitrided layer at least in the second region; and
  (iv) applying a coating of chromium nitride or the like.

BRIEF DESCRIPTION OF THE DRAWINGS

The present invention will be described next in more details, based on an example of execution represented in the drawings. The figures show.

DETAILED DESCRIPTION OF THE FIGURES

Figure 1:
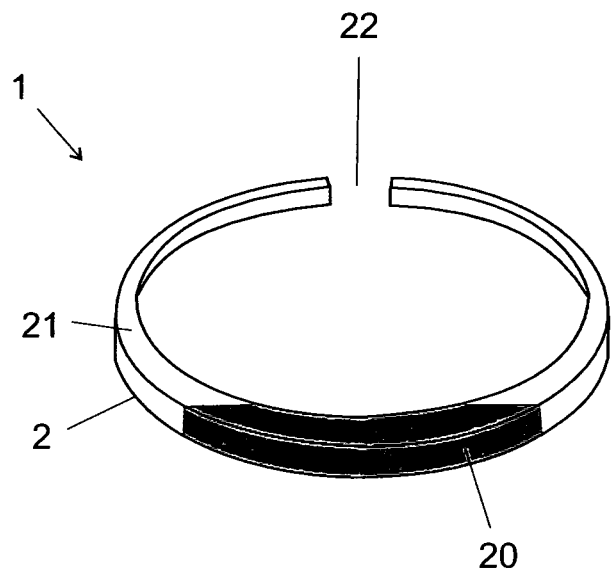
FIG. 1—is a schematic view in perspective of the piston ring covered by the present invention.
Figure 2:
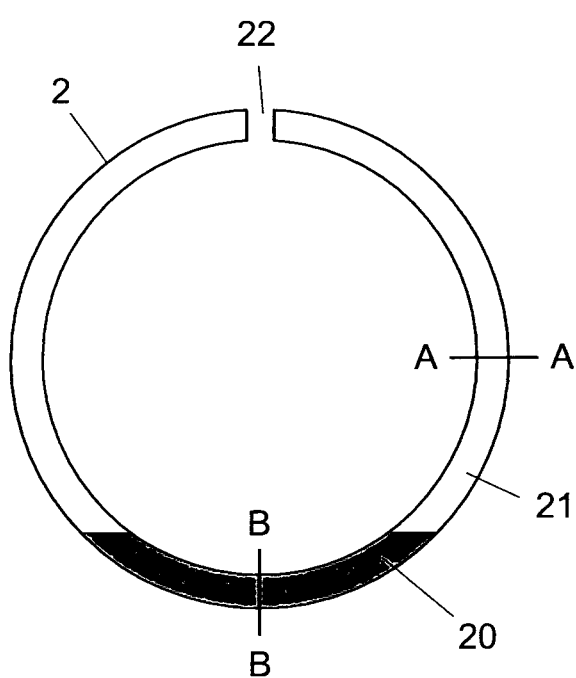
FIG. 2—is a first schematic upper view of the piston ring covered by the present invention.
Figure 3:
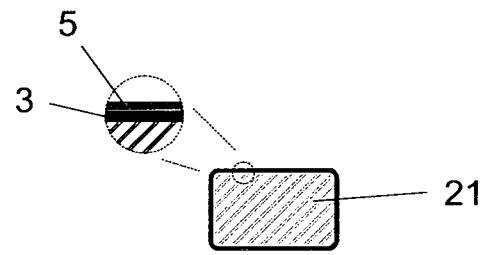
FIG. 3—is a first schematic A-A sectional view of the piston ring covered by the present invention.
Figure 4:
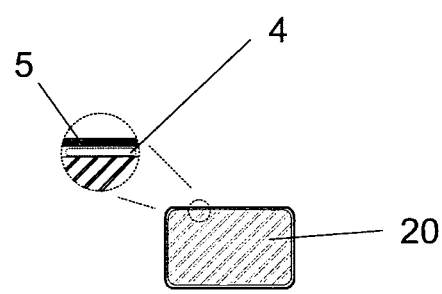
FIG. 4—is a second schematic B-B sectional view of the piston ring covered by the present invention.
Figures 5, 6:
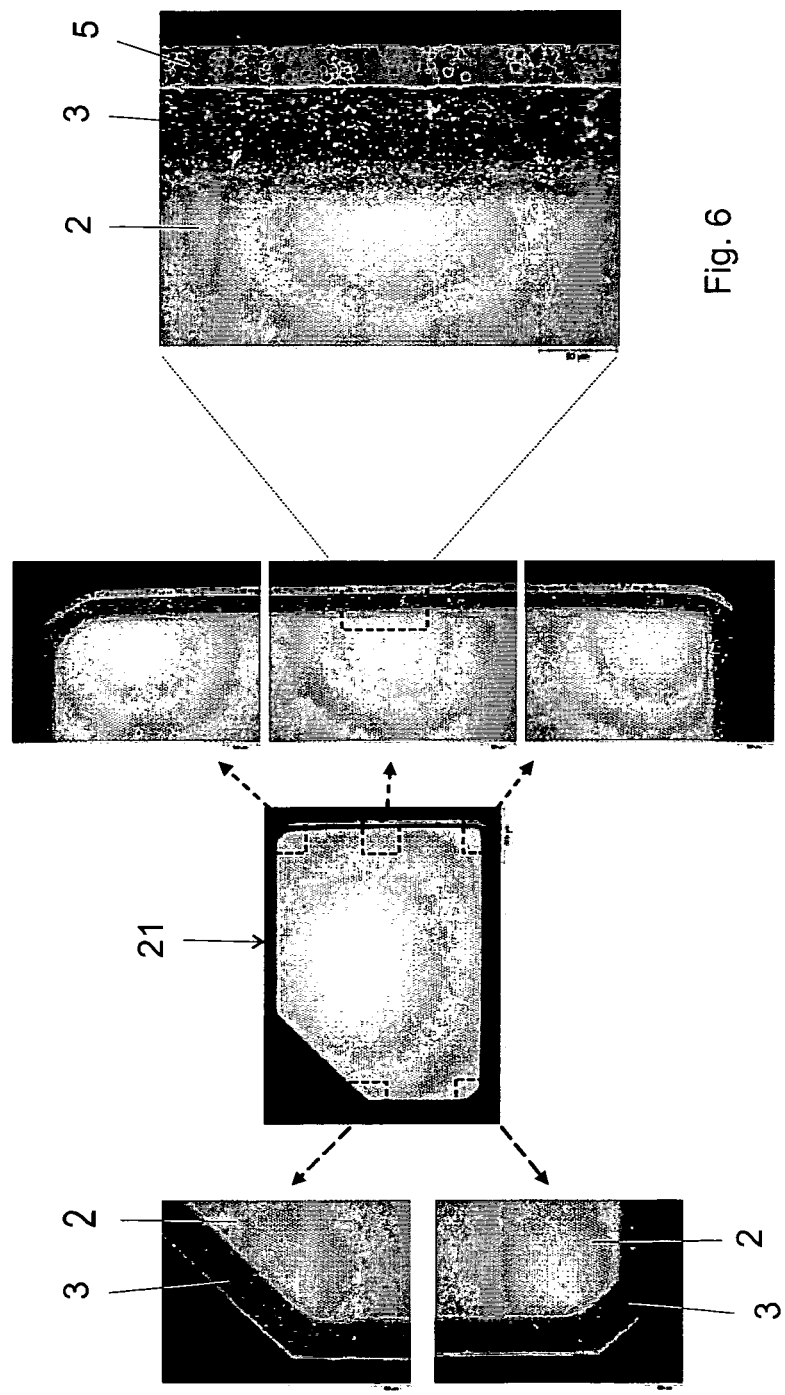
FIG. 5—is a sectional photograph in A-A position of the piston ring covered by the present invention.
FIG. 6—is a detailed photograph of the coating of the outer face of the section in A-A position illustrated in FIG. 5.
Figures 7, 8:
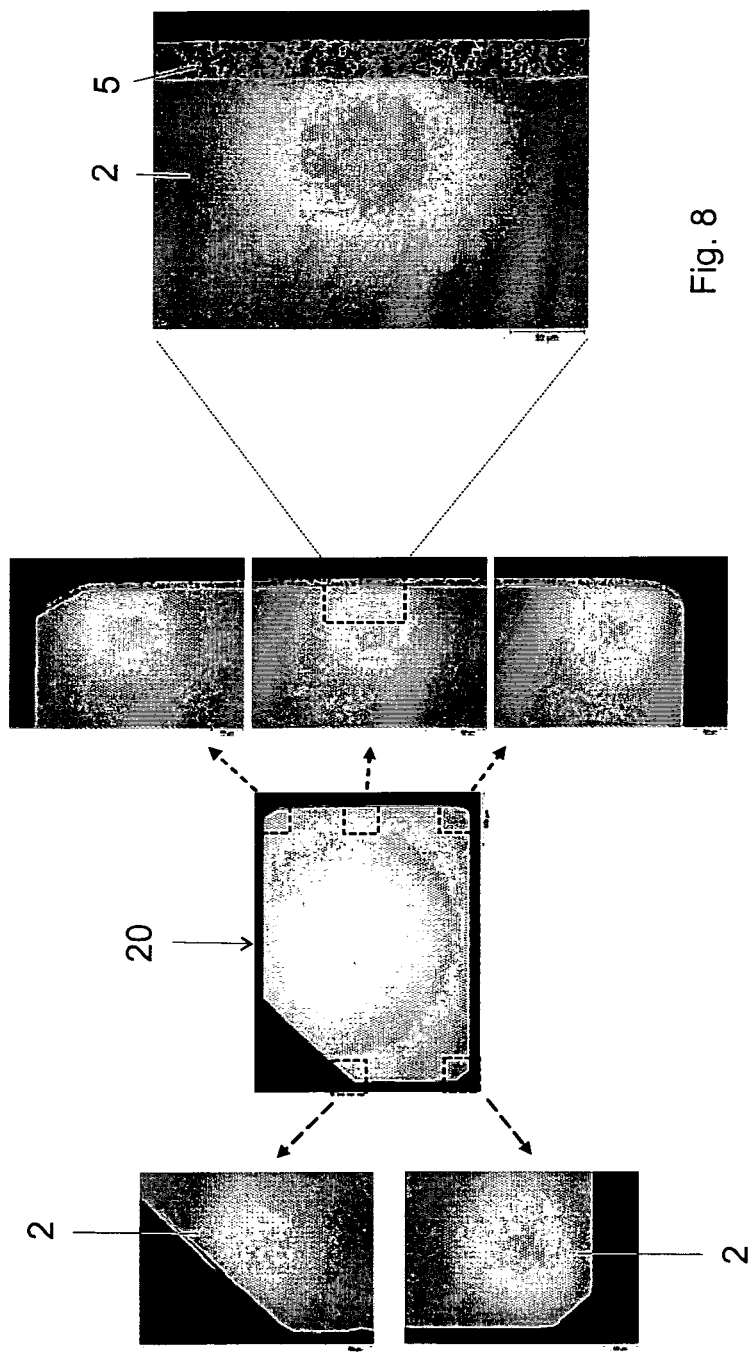
FIG. 7—is a sectional photograph in B-B position of the piston ring covered by the present invention.
FIG. 8—is a detailed photograph of the coating of the outer face of the section in B-B position illustrated in FIG. 7.

The present invention refers to a piston ring 1, particularly for use in the piston channel of an internal combustion engine or a compressor.

Preferably, but not in a limiting manner, the ring 1 covered by the present invention is a compression ring for use in an internal combustion engine which operates under a four-stroke cycle, but it is evident that any other applications may be obtained without leaving it outside the protection scope of the attached claims, such as an oil ring.

As previously mentioned, the applicant has performed exhaustive studies, tests, simulations and highlighted that—in a compression ring used in engines and coated with a hard coating layer to reduce the ring wearing caused by the displacement of the piston in the cylinder—breaking occurred, in most cases, in the region positioned in a manner substantially opposite to the gap or slit.

More specifically, in most cases, the micro-cracks, which may lead to the ring rupture, started in the running surface of the ring (the one turned to the cylinder wall), even because of its pointed edge.

An alternative was, by means of another stage in the manufacturing process, to chamfer such corner, breaking the end and rounding it, a procedure which obviously reduced the building up and concentration of stresses in that place. However, such chamfering needed to be performed very accurately, to prevent the ring from having lower performance levels, once the chamfers or rounded corners in the lower corner of the surface in contact with the cylinder reduce the efficiency in scraping the oil from the wall. Thus, excessive chamfer (or rounding), on the one side, allows a substantial reduction of internal stress and, on the other side, causes a raise in the consumption of lubricating oil and, consequently, a raise in the levels of emission of pollutants.

Once it was necessary to eliminate this drawback without the need of performing chamfers of large dimension, the ring covered by this invention was born, which does not have a nitrided layer in the portion opposite to the gap, brilliantly fulfilling all the requirements of performance and durability.

Describing in details, the piston ring 1 covered by the present invention comprises at least a substantially ring-shaped metallic base 2 having at least a first region 20, at least a second region 21 and at least a gap 22.

Preferably, the base 2 is comprised by stainless steel containing 10% to 17% of chromium in weight, but it is evident that this is only one of the several possible configurations. Alternatively, it is possible to conceive a base 2 of carbon steel, molten iron, titanium or a base 2 made of any other alloy; after all, all of these materials are already largely used for manufacturing piston rings.

As it can be seen in the figures, the first region 20 is positioned in a manner substantially opposite to the gap 22. Considering that the base 2 is substantially ring-shaped, and defining that the gap 22 is positioned at a position of 0° (zero degree), the first region is positioned at, and substantially adjacent to, position of 180° degrees, which is the one which undergoes the heaviest efforts, facilitating the emergence of micro-cracks when a hard coating, which little ductility, is applied thereto.

One cannot forget that, when positioned in the piston channel (and that this moves linearly and alternately inside the cylinder), the ring undergoes a series of efforts whose effects are leveraged exactly in the region opposite to the gap, making it more critical to the emergence of micro-cracks and even to the possible break of the ring, with consequent structural collapse.

Studies carried out by the applicant indicated that the first region 20 does not correspond only to the point positioned exactly 180° from the gap 22 but to a larger regional which extends, even if discreetly, angularly towards the gap 22. Preferably, the first region 20 is the region substantially arranged between 140° and 220° counted from the gap 22, therefore corresponding to approximately 80° from the base 2, which presents, as it could not be otherwise, 360°.

Thus, a little less than 25% of the ring corresponds to the region to which the nitrided layer is not applied at the risk of appearing potentially destructive micro-cracks.

However, it is evident that the scope of the first region 20 may vary, being perfectly possible a piston ring 1 built according to the instructions of the present invention in which it corresponds to less than 80°, or, alternatively, even more, without leaving the resulting invention out of the protection scope of the claims. However, for practical effects, it is possible to consider that hardly will the first region 20 correspond to 180° or more from the base 2 as a whole.

To avoid the emergence of potentially destructive cracks, the first region 20 of the base 2 of the ring 1 covered by the present invention initially receives an intermediate layer 4 which reduces or prevents the formation of a nitrided layer 3 there, whereas in the second region 21, which corresponds to most of the base 2 of the ring 1 and where there are not so heavy efforts, the free formation of this nitrided layer 3 is allowed.

Later on, after the formation of the nitrided layer in the second region 21, a coating of chromium nitride (CrN and/or $Cr_2N$) 5 is applied by the process of ion plating or PVD (Physical Deposition) all over the extension of the ring, (comprising the first and second regions 20 and 21), ensuring the ring 1's resistance to the successive friction from the constant movement of the piston inside the cylinder, for millions of working cycles in the engine.

A preferable embodiment of the invention, illustrated in the figures, shows a first region 20 which is completely coated with an intermediate layer 4 (that is, applied over all its cross section). However, it is perfectly possible, and feasible, a piston ring 1 in which the intermediate layer 4 (which reduces or prevents the formation of the nitrided layer 3) is applied not to all the superficial area of the first region 20 of the base 2, but only to those more critical places regarding to the building up of internal stresses, just as to the running surface, turned to the cylinder wall, or also any other solution which is technically feasible.

Preferably, the intermediate layer 4 is a fine layer of metallic nickel; however, alternatively, the layer of nickel may be replaced with special coatings which perform the same task, namely to reduce or prevent the formation of a nitrided layer, that is, with an equivalent functionality.

One other special protective coating that could be applied to the intermediate layer 4 is a protective ink. This protective coating when applied to the intermediate layer 4 will achieve results with the same objective of increasing ring fracture resistance. When applying a protective ink to the intermediate layer 4 the protective ink will partially block the effects of the nitriding treatment and the nitrided layer thickness is reduced by at least 30%.

For manufacturing the ring 1 covered by the present invention, after the full conformation of the base 2 (which may vary quite a lot, as previously mentioned), the intermediate layer 4 of nickel or protective ink is initially applied to the first region 20. This intermediate layer may be applied by any process which is technically feasible, for instance, any chemical or electrochemical processes. The intermediate layer 4, in the case of nickel, is preferably composed of pure nickel and, in the case of the protective ink, may be any composition that varies according to the reduction of the nitriding one wishes to achieve. Anyway, the intermediate layer 4 comprises thicknesses which range from 1 to 50 µm.

The intermediate 4 may be applied all over the cross section of the first region 20 or only to those more critical places regarding the building up of internal stresses, such as to the running surface, turned to the cylinder wall, specifically in view of the properties of the ring one wishes to obtain.

After finishing applying the intermediate layer 4 to the first region 20, the nitrided layer 3 is formed, which, exactly due to the presence of the intermediate layer 4, ends up not adhering to/being formed, or will be partially blocked, in this first region 20, but is totally formed on the rest of the base 2, that is, in the second region 21.

Therefore, the intermediate layer 4 has a primordially protective role, reducing or avoiding the nitriding of the first region 20 of the ring.

Figure 9:
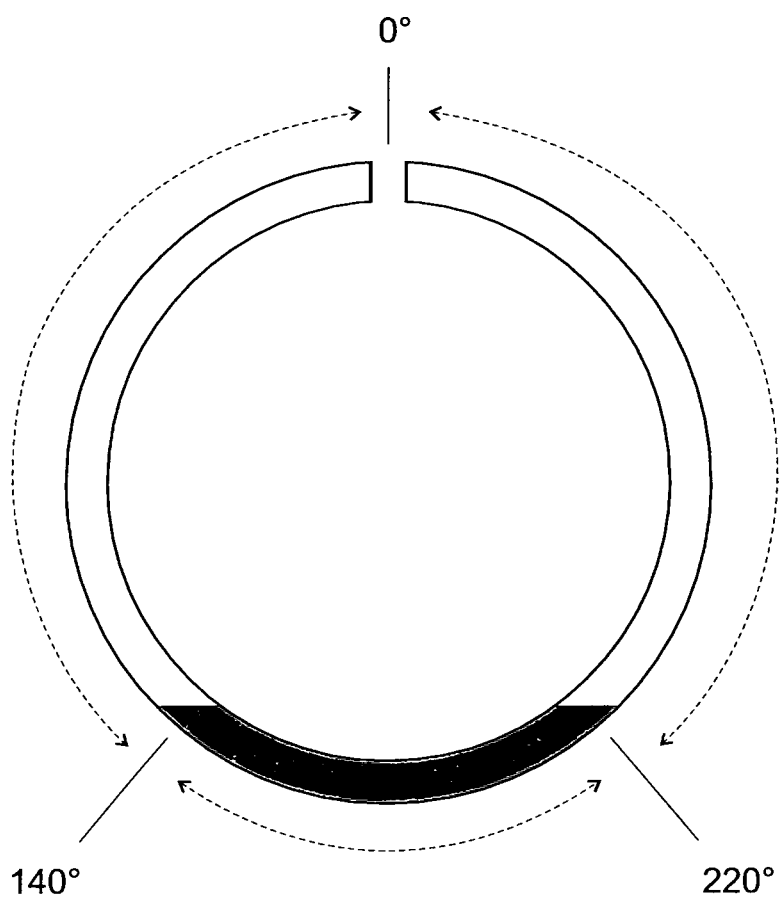
FIG. 9—is a second schematic upper view of the piston ring covered by the present invention.
Figure 10:
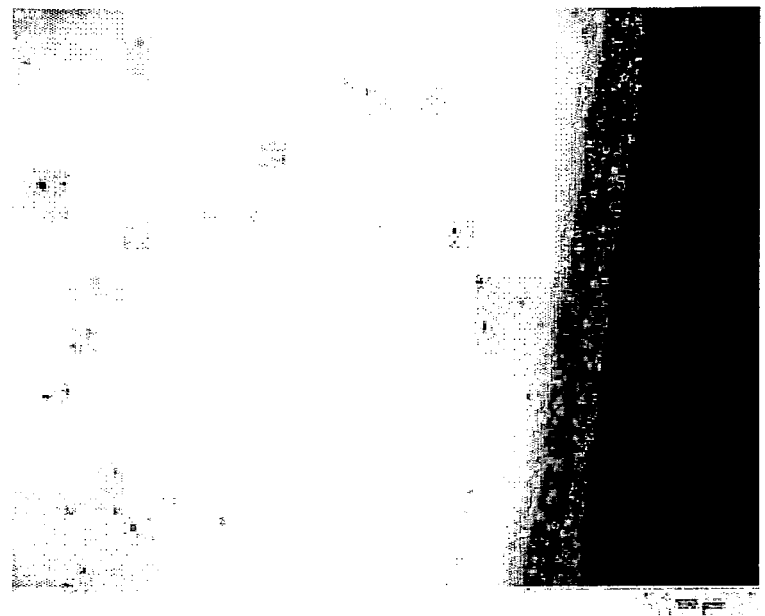
FIG. 10—is a cross section view of a nitride ring in with the protective ink applied in the first region.
Figure 11:
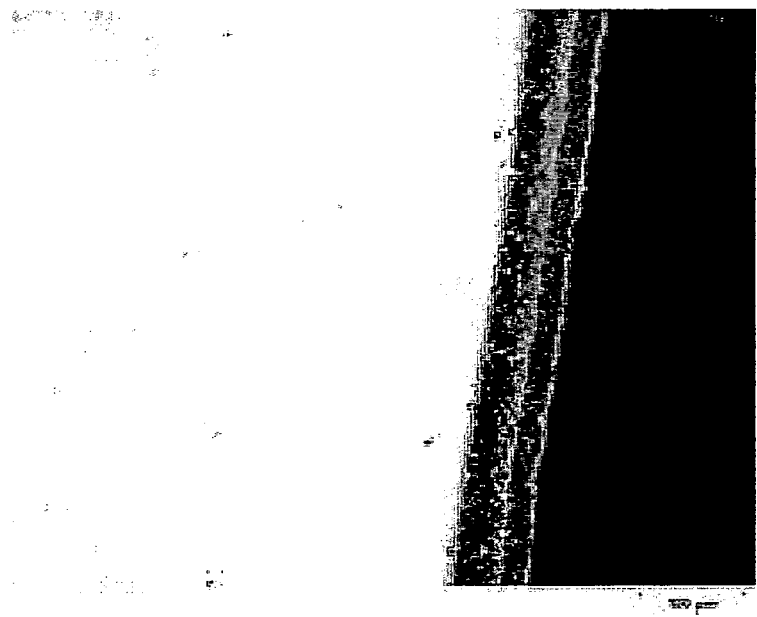
FIG. 11—is a cross section view of a nitride ring in without the protective ink applied in the first region.

As already mentioned, when applying a protective ink to the intermediate layer 4, the effects of the nitriding treatment will partially be blocked and the nitrided layer thickness is reduced by at least 30%. FIGS. 10 and 11 present a cross section of a ring in the regions with (FIG. 9) and without (FIG. 10) the protective ink.

Note that the metallurgical analysis showed a nitrided layer reduction of 50% in the region that was applied the protective ink. Based on the results, it was concluded that protective ink significantly reduced the nitriding at the first region 20.

The applied thickness of the protective ink was 30 µm and the effectiveness of the ink was evaluated by measuring the nitrided layer depth in different regions, with and without the application of the protective ink. Naturally, the thickness of the protective ink will have an influence in the blockage of the nitride layer. The thickness of the protective ink can change between a range of 1 µm to 50 µm according to the desired reduction of the nitride layer After the formation of the nitrided layer 3 in the second region 21, the intermediate layer 4 may or not be removed from the first region 20 by chemical processes (such as chemical etching, for instance) and/or mechanical processes (cutting, abrasion, grit blasting, etc). The removal of the intermediate layer 4 will depend on the needs of the subsequent PVD process.

Therefore, in situations in which the intermediate layer 4 is removed, usually when an intermediate layer of nickel is applied, the ring presents a nitrided layer 3 only in the region unprotected by the nickel (second region 21), whereas in the first region 20 the ring is in its natural form, that is, with no nitrided layer which facilitates the building up of internal stresses and enables, more easily, the existence of potentially destructive micro-cracks.

Due to the action of the nitriding stage, sometimes the nickel is pushed so hard to the inner side of the metallic substratum that its removal may become unfeasible from the process perspective. Alternatively, the intermediate layer 4 can be made with the protective ink. Even knowing the effect of reduction of the nitrided layer thickness in the first region 20, it improves the fracture resistance by increasing ring toughness by means of increasing the nitrided layer ductility in the first region 20.

Following the common machining operations, the ring receives, in the final stage of the process, said layer of coating of chromium nitride 5 (CrN and/or $Cr_2N$) or another necessary or desirable material, preferably applied by PVD, but which evidently can be done by any other functional method.

It is important to mention that one of the advantages brought by the use of the protective ink, when compared to the layer of nickel, is due to the fact that the phase of preparing the ring for the PVD coating successfully removes the intermediate layer 4 of protective ink without the need of any additional stage. Therefore, it facilitates the process if compared to situations in which it is necessary to remove the protective layer of nickel.

Finally, it is also an inventive and new invention, included in the protection scope of the claims, the process for manufacturing the present piston ring 1, comprising the following stages:
 (i) full conformation of the base 2;
 (ii) applying an intermediate layer 4 to the first region 20;
 (iii) formation of a nitrided layer 3 at least in the second region 21;

(iv) applying a coating of chromium nitride 5 (CrN and/or Cr$_2$N) applied by the process of Ion plating or PVD, or the like.

In stage (ii), the intermediate layer 4 is applied to all the cross section of the base 2 in the first region 20 or, alternatively, to part of the cross section of the base 2 in the first region 20, more specifically to the running surface, turned to the cylinder wall. Preferably, the intermediate layer 4 applied in stage (ii) is protective ink or has nickel in its composition.

Alternatively, when necessary, between stage (ii) and (iii) there may be a stage for removing the intermediate layer 4

Finally, in stage (iv), the coating comprised by chromium nitride 5 or the like is applied all over the ring extension, which comprises the regions 20 and 21, this happening preferably through the PVD process.

Figure 12:
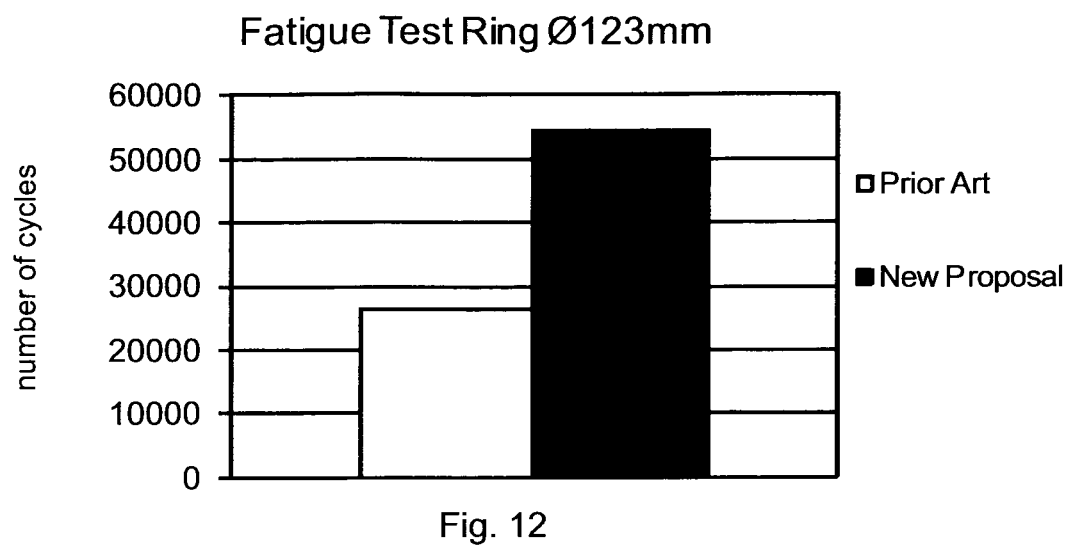
FIG. 12—is a graphic representing a fatigue test comparison between a prior art ring and the ring of the present invention.
Figure 13:
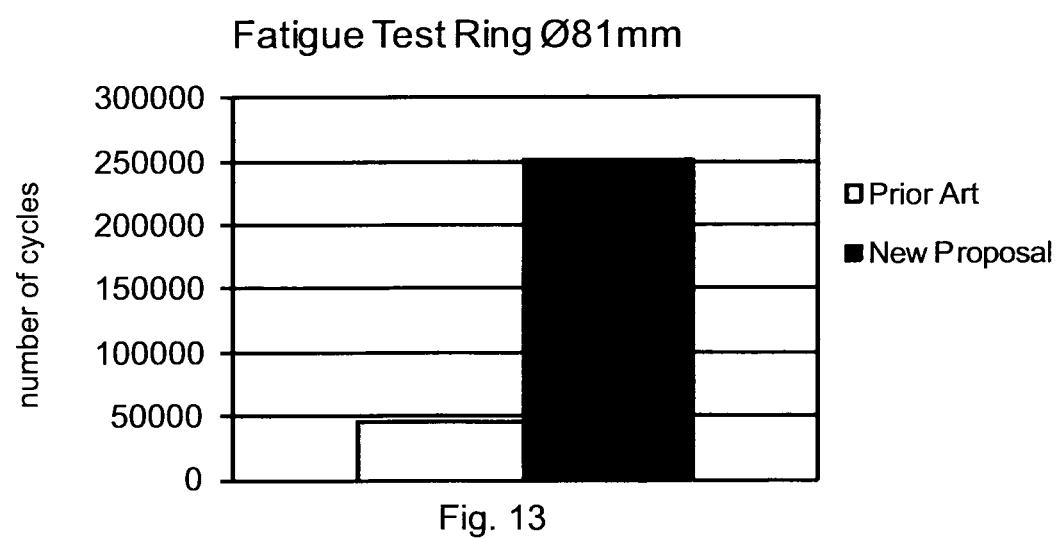
FIG. 13—is a graphic representing a fatigue test comparison between a prior art ring and the ring of the present invention.

In order to better demonstrate the excellent benefits that can be achieved by the object of the present invention, FIGS. 12 and 13 show a comparative fatigue study between a ring of the state of the art and a ring covered by the present invention. It is worth noting that the ring of the present invention used in the test suffered an intermediate layer 4 containing metallic nickel.

The table 1 below presents the data results of the performed fatigue tests.

TABLE 1

Fatigue test of a prior art ring and a ring of the present invention
Fatigue Test - Number of Cycles

| | Ring Diameter 123 mm | | Ring Diameter 81 mm | |
| --- | --- | --- | --- | --- |
| Exp. | Prior Art | New Proposal | Prior Art | New Proposal |
| #1 | 23440 | 57260 | 46980 | 210910 |
| #2 | 25250 | 43440 | 43580 | 210910 |
| #3 | 28040 | 94320 | 44320 | 225390 |
| #4 | 28040 | 36950 | 43560 | 225680 |
| #5 | 26630 | 39650 | 47370 | 381650 |
| avg. X | 26280 | 54324 | 45162 | 250908 |
| std. dev s | 1965 | 23685 | 1868 | 73452 |
| min | 23440 | 36950 | 43560 | 210910 |
| max | 28040 | 94320 | 47370 | 381650 |
| Improvement | | 107% | | 456% |

Analyzing the presented data allows us to conclude that, regardless of the ring thickness, the benefits are huge, and the rings covered by this invention reach values that oscillate from two to almost five times more resistance to fatigue than those of the state of the art.

After describing an example of preferred embodiment, it shall be understood that the scope of the present invention encompasses other possible variations, being limited only by the contents of the attached claims, where the possible equivalents are included.

The invention claimed is:

1. A piston ring, for use in the piston channel of an internal combustion engine or a compressor, comprising at least a substantially ring-shaped metallic base (2) having a circumference, the base having at least a first region (20) extending over a first portion of the circumference of the ring, at least a second region (21) extending over a second portion of the circumference of the ring, said second portion being located adjacent the first portion along the circumference of the ring and being separate from the first portion, and at least a gap (22), the first region (20) being positioned in a manner substantially opposite to the gap (22), the ring comprising a nitrided layer (3) at least in the second region (21) and an intermediate layer (4) applied to the first region (20), the intermediate layer (4) applied to the first region (20) being configured to reduce the formation of the nitrided layer (3) in the first region (20) by at least 50% with respect to layer thickness as compared to a layer thickness of the nitrided layer (3) in the second region (21), wherein the first region (20) is a region of the base (2) substantially arranged between 140° and 220° counted from the gap (22), which is positioned at 0°, and wherein the second region encompasses the gap, wherein the first and second regions are at completely different angular regions of the base.

2. The piston ring according to claim 1, wherein the base (2) is comprised of stainless steel containing from 10% to 17% of chromium in weight.

3. The piston ring according to claim 1, wherein the intermediate layer (4) is applied over all surfaces of the base (2) in the first region (20).

4. The piston ring according to claim 1, wherein the intermediate layer (4) is applied to part of a surface of the base (2) in the first region (20).

5. The piston ring according to claim 1, wherein the intermediate layer (4) is comprised of a fine layer of 50 μm at the most.

6. The piston ring according to claim 1, wherein the intermediate layer (4) is comprised of a fine layer of protective ink.

7. The piston ring according to claim 1, wherein the intermediate layer (4) is comprised of a fine layer of metallic nickel.

8. The piston ring according to claim 1, wherein the intermediate layer (4) of the first region (20) is optionally removed after the formation of the nitrided layer (3) in the second region (21).

9. The piston ring according to claim 1, wherein the piston ring receives an application of a layer of coating of chromium nitride (5).

10. A piston ring for use in the piston channel of an internal combustion engine or a compressor, comprising at least a substantially ring-shaped metallic base (2) having a circumference, the base having at least a first region (20) along one part of the circumference, at least a second region (21) along a separate part of the circumference from the first region and at least a gap (22), the first region (20) being positioned in a manner substantially opposite to the gap (22), the ring comprising at least a nitrided layer (3) in the second region (21) and does not comprise any of the nitrided layer (3) in the first region (20), wherein the first region (20) is a region of the base (2) substantially arranged between 140° and 220° counted from the gap (22), which is positioned at 0°, and wherein the second region encompasses the gap, wherein the first and second regions are at completely different angular regions of the base.

11. The piston ring according to claim 10, further comprising an intermediate layer (4) applied to the first region (20).

12. The piston ring according to claim 10, wherein the first region (20) is the region of the base (2) substantially arranged between 140° and 220° counted from the gap (22), which is positioned at 0°.

13. The piston ring according to claim 10, wherein the base (2) is comprised of stainless steel containing 10% to 17% of chromium in weight.

14. The piston ring according to claim 11, wherein the intermediate layer (4) is applied to all surfaces of the base (2) in the first region (20).

15. The piston ring according to claim 11, wherein the intermediate layer (4) is applied to part of the surface of the base (2) in the first region (20).

16. The piston ring according to claim 11, wherein the intermediate layer (4) is comprised of a fine layer of metallic nickel.

17. The piston ring according to claim 10, further comprising a layer of coating of chromium nitride (5) on the piston ring.

18. A process for manufacturing the piston ring of claim 1, comprising the following stages:
   (i) forming the base (2);
   (ii) applying the intermediate layer (4) to the first region (20);
   (iii) forming the nitrided layer (3) at least in the second region (21); and
   (iv) applying a coating of chromium nitride (5).

19. The process according to claim 18, wherein, in stage (ii), the intermediate layer (4) is applied to all surfaces of the base (2) in the first region (20).

20. The process according to claim 18, wherein, in stage (ii), the intermediate layer (4) is applied to part of a surface of the base.

21. The process according to claim 18, wherein the intermediate layer (4) applied in stage (ii) is protective ink.

22. The process according to claim 18, wherein the intermediate layer (4) applied in stage (ii) contains nickel.

23. The process according to claim 18, wherein, in stage (iv), the coating is applied by a PVD process.

\* \* \* \* \*